United States Patent
Speck et al.

(10) Patent No.: US 8,535,031 B2
(45) Date of Patent: Sep. 17, 2013

(54) PNEUMATIC TIRE MOLD ADAPTER

(75) Inventors: Larry E. Speck, Akron, OH (US); Josef Kostelenski, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 13/372,538

(22) Filed: Feb. 14, 2012

(65) Prior Publication Data

US 2013/0209595 A1 Aug. 15, 2013

(51) Int. Cl.
*B29D 30/02* (2006.01)

(52) U.S. Cl.
USPC .......................... 425/28.1; 425/36

(58) Field of Classification Search
USPC ................................. 425/28.1, 36
See application file for complete search history.

(56) References Cited

U.S. PATENT DOCUMENTS

| | | | |
|---|---|---|---|
| 1,450,256 A | 3/1919 | Goodenberger | |
| 1,351,156 A | 8/1920 | Burnett et al. | |
| 1,688,869 A | 10/1928 | Lambert | |
| 1,719,218 A | 7/1929 | Gammeter | |
| 1,779,396 A | 10/1930 | Keller | |
| 1,781,658 A | 11/1930 | Keller | |
| 1,870,805 A | 8/1932 | Gammeter | |
| 2,612,461 A | 9/1952 | Hallagren | |
| 2,921,337 A * | 1/1960 | Frohlich et al. | 425/36 |
| 3,012,277 A * | 12/1961 | Soderquist | 425/36 |
| 3,704,082 A * | 11/1972 | Hottle | 425/46 |
| 3,902,836 A | 9/1975 | McIntosh | |
| 3,986,802 A | 10/1976 | Isom | |
| 4,095,637 A | 6/1978 | Krishnan | |
| 4,257,994 A | 3/1981 | Leblanc et al. | |
| 4,360,335 A | 11/1982 | West | |
| 4,575,438 A * | 3/1986 | Fike et al. | 264/36.14 |
| 4,909,972 A | 3/1990 | Britz | |
| 5,667,812 A | 9/1997 | Shimizu | |
| 5,676,980 A | 10/1997 | Gulka et al. | |
| 5,961,913 A * | 10/1999 | Haase | 425/36 |
| 6,277,317 B1 * | 8/2001 | Vannan et al. | 425/36 |
| 6,318,985 B1 * | 11/2001 | Heindel et al. | 425/46 |
| 6,398,533 B1 * | 6/2002 | Hanya et al. | 425/36 |

(Continued)

FOREIGN PATENT DOCUMENTS

| | | | |
|---|---|---|---|
| JP | 5-200753 | * | 8/1993 |
| JP | 5-338063 | * | 12/1993 |

(Continued)

OTHER PUBLICATIONS

Sung Ran Hong; International Search Report and Written Opinion; Jun. 2, 2013; pp. 1-9; Korean Intellectual Property Office; Daejeon Metropolitan City, Republic of Korea.

*Primary Examiner* — James Mackey

(57) ABSTRACT

A solid tire mold includes upper and lower pneumatic tire molds. The pneumatic tire molds have adapter receiving surfaces disposed radially inwardly. The pneumatic tire molds are joined at the pneumatic mold receiving portions. The pneumatic tire molds form tread molding surfaces and at least a portion of the shoulder molding surfaces. The solid tire mold also includes toroidal adapters, each having an annular pneumatic mold receiving surface, an annular solid tire curing surface, and a toroidal flange. The flange extends axially inwardly from the lateral wall toward an inner end. The inner end of the flange can be tapered. A toroidal rim extends laterally from one toroidal adapter to the other. The rim is disposed radially outwardly from the toroidal flanges in the assembled solid tire mold.

8 Claims, 4 Drawing Sheets

(56) References Cited

U.S. PATENT DOCUMENTS

| | | |
|---|---|---|
| 6,402,490 B1 * | 6/2002 | Menard .................. 425/36 |
| 6,502,612 B2 | 1/2003 | Hsiao |
| 6,872,271 B2 | 3/2005 | Nowotarski |
| 7,572,120 B2 | 8/2009 | Ouyahia et al. |
| 2002/0020939 A1 | 2/2002 | Jasani et al. |
| 2003/0143294 A1 | 7/2003 | Fike |

FOREIGN PATENT DOCUMENTS

| | | | |
|---|---|---|---|
| JP | H07-125506 | | 5/1995 |
| JP | H09-076240 | | 3/1997 |
| JP | 2006-62234 | * | 3/2006 |
| JP | 2010012658 | | 1/2010 |
| JP | 2011156772 | | 8/2011 |

* cited by examiner

PNEUMATIC TIRE MOLD ADAPTER

FIELD OF INVENTION

The present disclosure is directed to tire molds for construction of solid tires. More particularly, the present disclosure is directed to solid tire molds adapted from pneumatic tire molds.

BACKGROUND

A particular tread design may be useful in both solid tire applications and pneumatic tire applications. Due to the differing processes used for constructing solid tires and pneumatic tires, different molds are used when curing solid tires and pneumatic tires. In order to form the internal cavity of a pneumatic tire, a pneumatic bladder expands inside a green tire situated within a mold during the curing process, while no such bladder fills a solid tire, which is formed of rubber material that completely fills the mold.

SUMMARY

A solid tire mold according to the present teachings includes upper and lower pneumatic tire molds. The pneumatic tire molds have adapter receiving surfaces disposed radially inwardly. The pneumatic tire molds are joined at the pneumatic mold receiving portions. The pneumatic tire molds form tread molding surfaces and at least a portion of the shoulder molding surfaces.

The solid tire mold also includes annular adapters, each having an annular pneumatic mold receiving surface, an annular solid tire curing surface, and an annular flange. The flange extends axially inwardly from the lateral wall toward an inner end. The inner end of the flange can be tapered. An annular rim extends laterally from one annular adapter to the other. The rim is disposed radially outwardly from the annular flanges in the assembled solid tire mold.

BRIEF DESCRIPTION OF THE DRAWINGS

In the accompanying drawings, structures are illustrated that, together with the detailed description provided below, describe exemplary embodiments of a solid tire mold adapted from a pneumatic tire mold according to the present teachings. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions. For ease of reference, the terms below concerning directions or orientations are made with reference to the tire shape formed within a mold made according to the present teachings. It will be understood that no tire or any materials that will form a tire need be present inside the mold for such definitions to be applicable.

"Axial" or "axially" refer to a direction that is parallel to the axis A.

"Equatorial plane" refers to the plane that is perpendicular to the tire's axis of rotation and passes through the center of the tire's tread, equidistant from the tread edges.

"Lateral" or "laterally" refer to a direction along the tread from one sidewall of a tire to the other sidewall.

"Radial" or "radially" refer to a direction perpendicular to the axis of rotation of a tire.

"Sidewall" refers to that portion of the outer surface of the tire between the tread and the wheel.

"Tread" refers to that portion of the tire that comes into contact with the road under normal load.

The terms "radially inward" and "radially inwardly" refer to a general direction toward the axis of rotation of a tire, whereas "radially outward" and "radially outwardly" refer to a general direction away from the axis of rotation of a tire. The terms "axially inward" and "axially inwardly" refer to a general direction toward the equatorial plane of a tire, whereas "axially outward" and "axially outwardly" refer to a general direction away from the equatorial plane of a tire.

Figure 1:
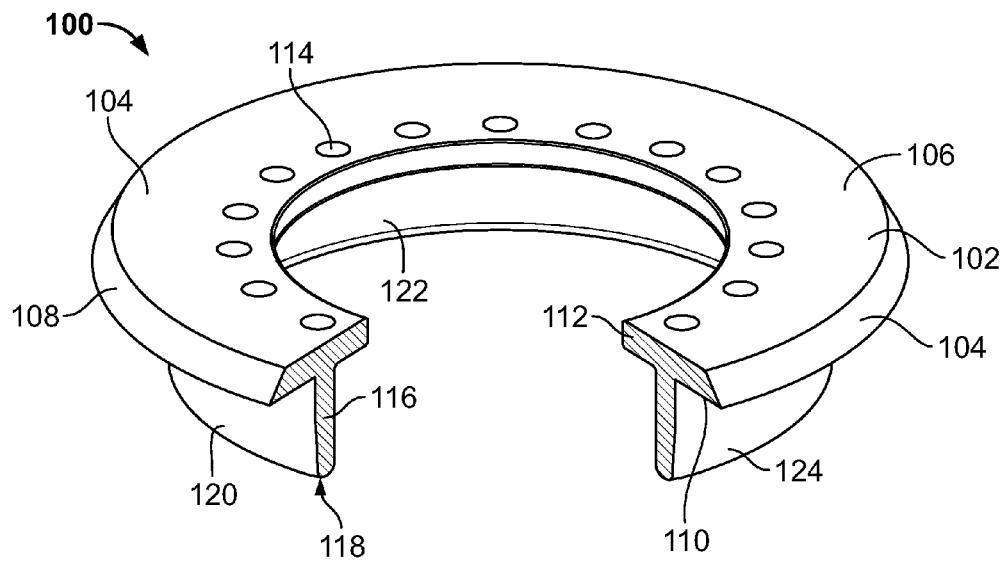
FIG. 1 illustrates a perspective view of a pneumatic tire mold adapter according to the present teachings.
Figure 2:
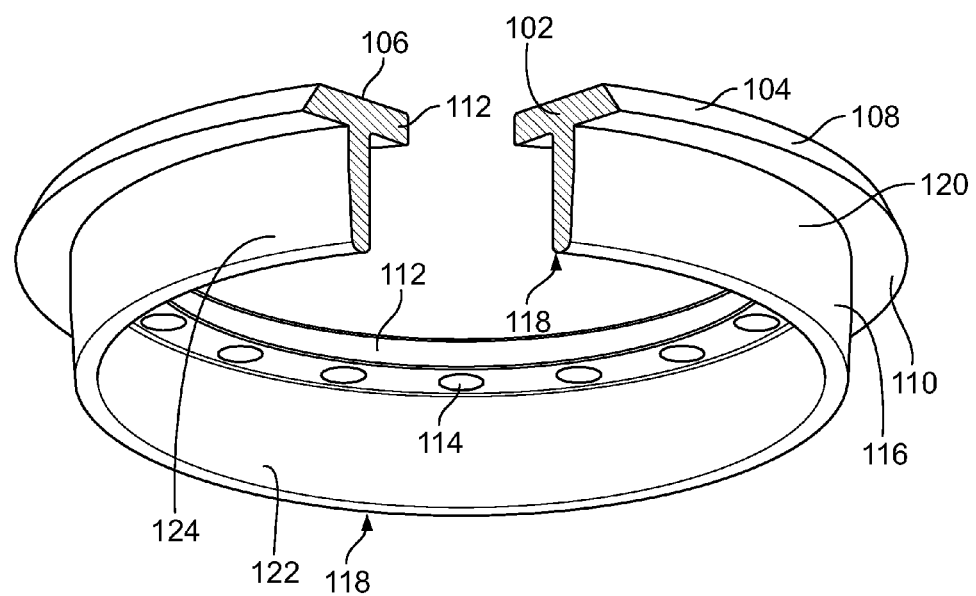
FIG. 2 illustrates an alternative perspective view of a solid tire mold adapter according to the present teachings.

As shown in FIGS. 1 and 2, according to one aspect of the present teachings, a solid tire mold adapter 100 has an annular shape. Lateral wall 102 has an annular pneumatic mold receiving surface 104 having an axially outer surface 106, and an angled surface 108 that joins surface 106 with solid tire curing surface 110. In another aspect of the present teachings, lateral wall 102 has a fastening portion 112 through which fastener holes 114 extend. Fastener holes 114 allow fasteners to removeably secure adapter 100 to portions of a pneumatic tire mold in the manner described herein. Flange 116 extends from wall 102 at about a perpendicular angle to wall 102 and terminates at end 118. According to an additional aspect of the present teachings, flange 116 has a radially outer surface 120 and a radially inner surface 122. Flange 116 is tapered adjacent its end 118. The tapered end is formed by an angled portion 124 of the radially outer surface 120 adjacent the flange end 118.

Figure 3:
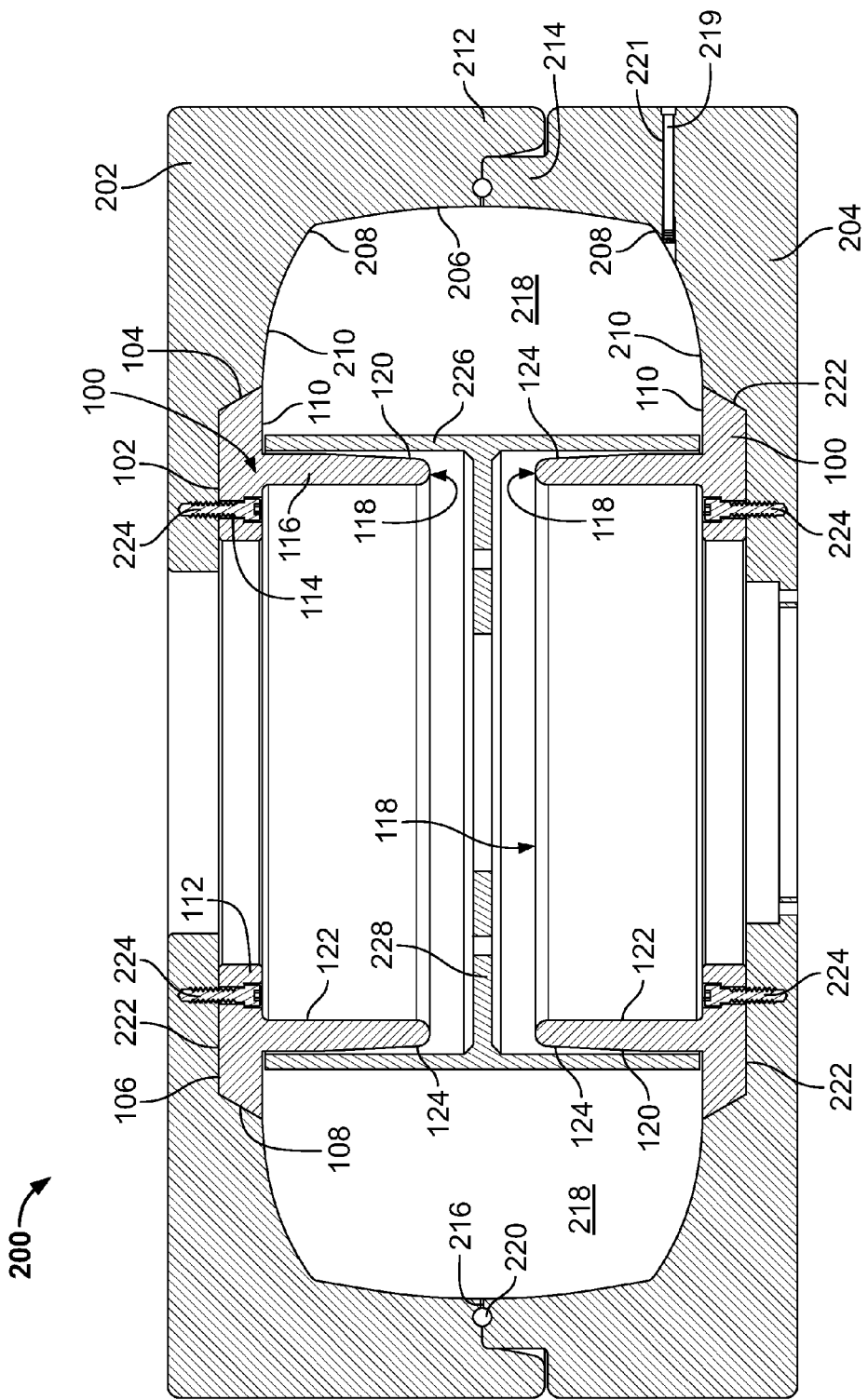
FIG. 3 illustrates an exploded view of a solid tire mold according to the present teachings.

FIG. 3 illustrates additional aspects of the present teachings. Solid tire mold 200 includes two adapters 100, each secured to one of a top portion 202 and bottom portion 204 of a pneumatic tire mold. The top portion 202 and bottom portion 204 form a tread molding surface 206, shoulder molding surfaces 208, and along with solid tire molding surface 110, form part of sidewall molding surface 210. In yet other aspects of the present teachings, the solid tire molding surface 110 may extend further along the sidewall molding surface 210 toward the tread molding surface 206, such that the solid tire molding surface 110 can in certain aspects form the entire sidewall of the tire and can also form a portion of the shoulder of the solid tire.

The top portion 202 and bottom portion 204 of a pneumatic tire mold are joined at pneumatic tire mold receiving portions 212, 214. The top pneumatic tire mold portion 202 includes the first pneumatic tire mold receiving portions 212, while the bottom pneumatic tire mold portion 204 includes the second pneumatic tire mold receiving portions 214. The pneumatic tire mold receiving portions 212, 214 have complementary shapes that facilitate joining the top portion 202 and bottom portion 204. When the top portion 202 and bottom portion 204 are joined, a small inlet 216 is formed allowing tire material to escape from cavity 218 to overflow passage 220. The inlet 216 and passage 220 allow for small amounts of excess material, for example uncured rubber from a green solid tire, to exit cavity 218 during the molding process. Thermocouple 219 is inserted into thermocouple passage 221, allowing for detection of temperature of the rubber inside the cavity 218.

Top and bottom pneumatic tire mold portions 202, 204 each have adapter receiving surfaces 222 disposed radially inwardly. The adapter receiving surfaces 222 have a shape complementary to pneumatic mold receiving surface 104, and in particular, complementary to axially outer surface 106 and angled surface 108. In one aspect of the present teachings, the adapter receiving surfaces 222 are dually configured to receive curing rings suitable for operation of a pneumatic mold and its pneumatic bladder. Adapters 100 are removeably secured to top and bottom pneumatic tire mold portions 202, 204 with fasteners 224.

Figure 4:
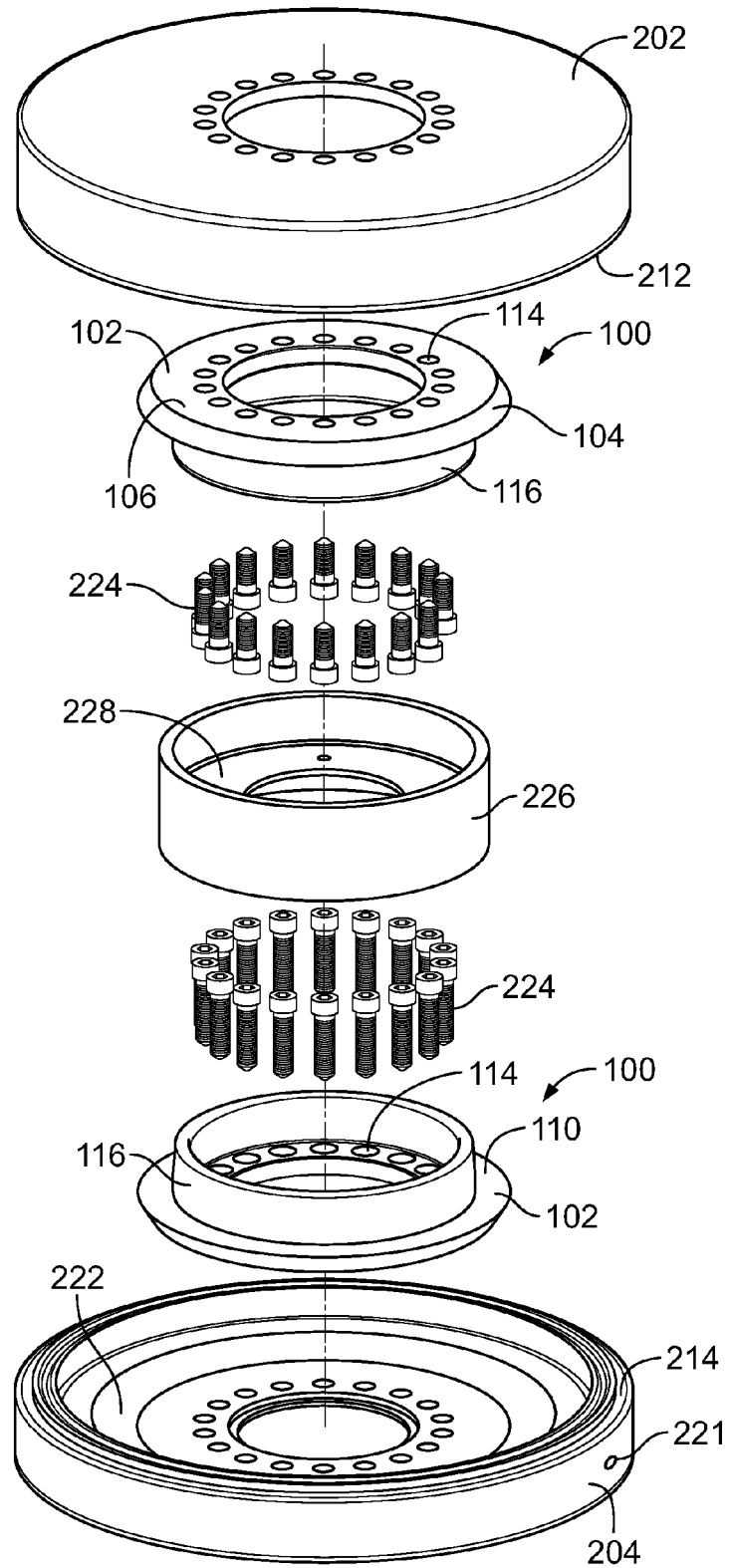
FIG. 4 illustrates a sectional view of a solid tire mold according to the present teachings.

With continued reference to FIG. 3, rim 226 extends laterally from one adapter 100 to the other adapter in the assembled mold 200. Rim 226 is disposed radially outwardly relative to the annular flanges 116 of the adapters 100. As shown in FIGS. 3 and 4, rim 226 and rim support 228 are also annular in shape. Rim 226 can receive extruded rubber material that can be wound around rim 226 until a sufficient amount of material is available for molding a solid tire. As shown in FIGS. 3 and 4, rim 226 sits between adapters 100 and radially outwardly relative to the radially outer surface 120 of flange 116. As can be seen in FIGS. 3 and 4, the tapered formed by angled portion 124 of flange 116 adjacent flange end 118 facilitates placement of the rim 226 between adapters 100 and minimizes potential interference between flanges 116 and rim 226. Flange ends 118 are offset from rim support 228.

Figure 5:
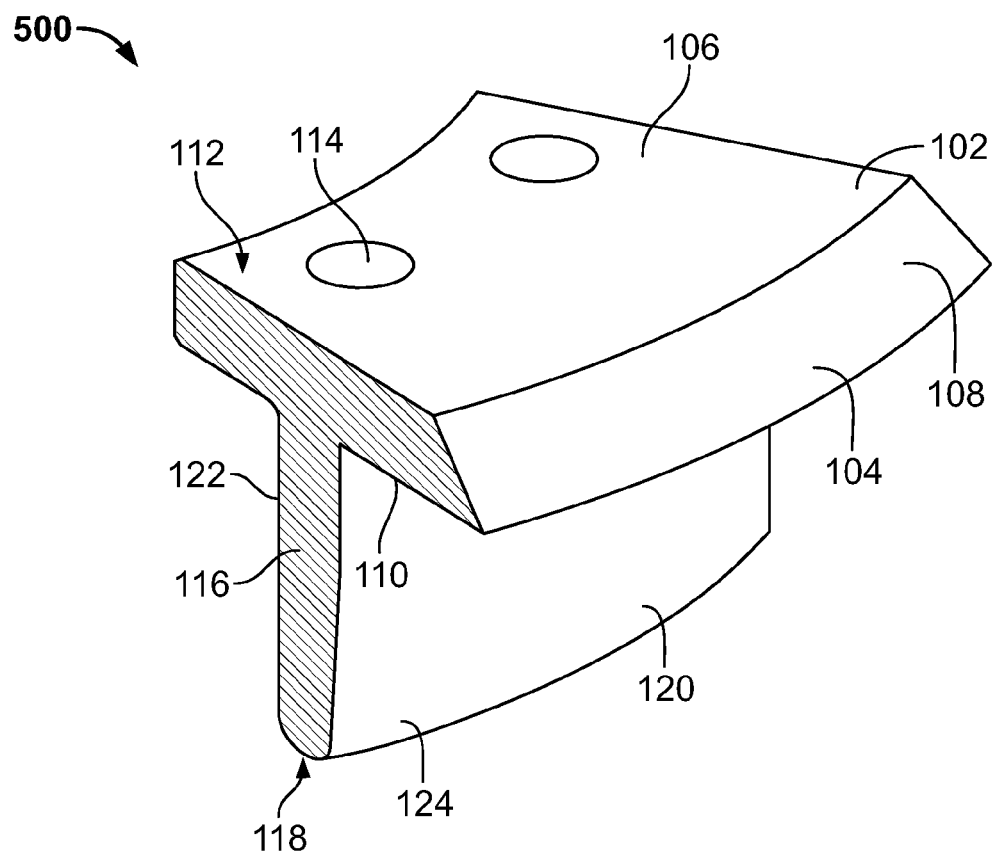
FIG. 5 illustrates an alternative pneumatic tire mold adapter according to the present teachings.

FIG. 5 illustrates an alternative adapter 500 according to the present teachings. Adapter 500 is an arcuate adapter having the same cross-sectional shape as adapter 100 shown in FIGS. 1-4. However, instead of an annular form, adapter 500 is an arcuate form configured to be used with multiple adapters 500 that are secured, for example, to one of the pneumatic tire mold portions 202, 204. Upon securing sufficient arcuate adapters 500 to a pneumatic tire mold portion 202, 204, the plurality of arcuate adapters 500 form an annular shape similar to that of adapter 100.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present disclosure illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A solid tire mold, comprising:
    first and second pneumatic tire mold portions having adapter receiving surfaces, the first pneumatic tire mold portion having a second pneumatic tire mold receiving portion, the second pneumatic tire mold portion having a first pneumatic tire mold receiving portion, the first and second pneumatic tire mold portions joined at the first and second pneumatic tire mold receiving portions to form a tread molding surface and at least a portion of first and second shoulder molding surfaces;
    first and second adapters, each of the first and second adapters having a lateral wall, an annular pneumatic mold receiving surface, an annular solid tire curing surface, and a flange extending axially inwardly from the lateral wall toward an inner end, the first adapter removeably secured to the first pneumatic tire mold portion, and the second adapter removeably secured to the second pneumatic tire mold portion; and
    a rim extending substantially from the annular solid tire curing surface of the first tire mold adapter substantially to the annular solid tire curing surface of the second tire mold adapter, and disposed radially outwardly from the flanges of the first and second adapters, the rim having a rim support extending radially inwardly therefrom, the rim support being disposed between the flanges of the first and second adapters, wherein the inner ends of the flanges of the first and second adapters are laterally offset from the rim support.

2. The solid tire mold of claim 1, wherein the first and second adapters have fastening portions disposed radially inwardly from the flanges, the fastening portions being configured to receive a fastener for securing the first and second adapters to the first and second pneumatic tire mold portions.

3. The solid tire mold of claim 1, wherein at least one of the inner ends of the flanges are tapered.

4. The solid tire mold of claim 1, wherein each of the flanges has a radially outer surface and radially inner surface, the radially outer surface having a tapered portion at the inner end of the flange.

5. A solid tire mold, comprising:
    first and second pneumatic tire mold portions having adapter receiving surfaces, the first pneumatic tire mold portion having a second pneumatic tire mold receiving portion, the second pneumatic tire mold portion having a first pneumatic tire mold receiving portion, the first and second pneumatic tire mold portions joinable at the first and second pneumatic tire mold receiving portions to form a tread molding surface and at least a portion of first and second shoulder molding surfaces;
    first and second adapters, the adapters having a lateral wall, an annular pneumatic mold receiving surface, an annular solid tire curing surface, and a flange extending axially inwardly from the lateral wall toward an inner end, the first adapter removeably securable to the first pneumatic tire mold portion, and the second adapter removeably securable to the second pneumatic tire mold portion; and a rim configured to extend substantially from the annular solid tire curing surface of the first tire mold adapter substantially to the annular solid tire curing surface of the second tire mold adapter, wherein the rim is further configured to be disposed radially outwardly from the flanges of the first and second adapters, wherein the rim has a rim support extending radially inwardly therefrom, wherein the rim support is configured to be disposed between the flanges of the first and second adapters, and wherein the inner ends of the flanges of the first and second adapters are configured to be laterally offset from the rim support.

6. The solid tire mold of claim 5, wherein each of the first and second adapters has fastening portions disposed radially inwardly from the flange, the fastening portions being configured to receive a fastener for securing the first and second adapters to the first and second pneumatic tire mold portions.

7. The solid tire mold of claim 5, wherein at least one of the inner ends of the flanges is tapered.

8. The solid tire mold of claim 5, wherein each of the flanges has a radially outer surface and a radially inner surface, the radially outer surface having a tapered portion at the inner end of the flange.

* * * * *